United States Patent [19]

Tsuboi et al.

[11] Patent Number: 5,410,142
[45] Date of Patent: Apr. 25, 1995

[54] OPTICAL CARD WITH PRINTING VISIBLE BELOW THE OPTICAL RECORDING

[75] Inventors: Kazuo Tsuboi; Koji Iguchi, both of Osaka, Japan

[73] Assignee: Omron Corporation, Kyoto, Japan

[21] Appl. No.: 29,062

[22] Filed: Mar. 10, 1993

[30] Foreign Application Priority Data

Mar. 10, 1992 [JP] Japan .................. 4-086407

[51] Int. Cl.$^6$ .................. G06K 19/16; G11B 7/24
[52] U.S. Cl. .................. 235/488; 283/88; 283/109; 235/487; 369/275.1
[58] Field of Search .............. 235/488, 487, 468, 491; 369/275.1, 273, 284; 283/88, 89, 91, 94, 109, 901, 904; 902/25, 28

[56] References Cited

U.S. PATENT DOCUMENTS

| | | | |
|---|---|---|---|
| 3,477,156 | 4/1967 | Naito | 283/88 |
| 3,640,009 | 2/1972 | Komiyama | 283/88 |
| 4,222,662 | 9/1980 | Kruegle | 283/88 X |
| 4,504,084 | 3/1985 | Jauch | 283/94 |
| 5,010,243 | 4/1991 | Fukushima et al. | 235/487 |
| 5,151,582 | 9/1992 | Fujioka | 235/440 X |
| 5,206,490 | 4/1993 | Petigrew et al. | 235/454 X |
| 5,259,907 | 11/1993 | Soules et al. | 283/88 X |

FOREIGN PATENT DOCUMENTS

| | | | |
|---|---|---|---|
| 0374256 | 6/1990 | European Pat. Off. | |
| 87059914 | 7/1985 | Japan | 283/88 |
| 3182988 | 8/1991 | Japan | 235/491 |
| 3261596 | 11/1991 | Japan | 283/88 |
| 4303692 | 10/1992 | Japan | 283/89 |
| 2228821 | 9/1990 | United Kingdom | |
| 9010916 | 9/1990 | WIPO | |

OTHER PUBLICATIONS

Patent Abstracts of Japan vol. 13, No. 526 (M-897) 22 Nov. 1989 & JP-A-01 214 487 (Sony Corporation) 28 Aug. 1989 *abstract*.

Primary Examiner—John Shepperd
Attorney, Agent, or Firm—Pennie & Edmonds

[57] ABSTRACT

An optical card having visible data marked on a base layer and a substantially transparent optical data recording layer formed over the base layer. A protective layer is laminated over the optical data recording layer. The visible data marked on the base may be marked in an ink visible only at a nonvisual wavelength, such as infrared. A reader scans the visible data marked on the base layer, since the optical recording layer covering the base layer is substantially transparent.

5 Claims, 8 Drawing Sheets

OPTICAL CARD WITH PRINTING VISIBLE BELOW THE OPTICAL RECORDING

FIELD OF THE INVENTION

This invention concerns an optical card on which data are optically recorded and reproduced and a device to read such a card.

BACKGROUND

FIG. 10 shows a relevant prior art optical card 101. FIG. 9 shows the actual structure of such a card. In these FIGS. 9 and 10, display symbols 3 constitute the logo and other information which is entered on a base layer 2. A light-absorbing printed layer 4, which consists of a paint having low reflectivity in the wavelength region of the light used to record and reproduce data, is painted onto the base layer 2. Layer 5, on which data are recorded optically, is laminated onto the light-absorbing printed layer 4 by means of film 6. Transparent layer 7 and protective layer 8 are laminated, in that order, so as to cover the entire surface of base layer 2. The prior art optical card 101 is thus completed.

To record data on the above-described optical card 101, a light beam is modulated in a manner corresponding to the symbols to be recorded. This light beam is trained on the recording layer 5, causing pitting on that layer.

To reproduce, or play back, the data from optical card 101, a light beam is aimed at the pits on recording layer 5. The light is diffracted by the pits, and the resulting modulated optical signals are detected by a photodetector (not pictured).

Layer 5 on the prior art optical card 101 has a large recording surface. This makes it difficult to check the area where visible data, consisting of characters, images, and the like, are stored on the card. To address this problem, it has been suggested that visible data such as characters, images (a photo of the cardholder's face, etc.) and the like be entered on the back of optical card 101. However, this scheme leaves open the possibility that the data might be obliterated by being rubbed off and new data being forged in their place.

One solution to prevent forgery or alteration of the visible data would be to emboss this data on the surface of the optical card, thereby displaying such data as the identification number or the account number, as is done on standard credit cards or cash cards. However, this causes the card to have a non-uniform thickness, which makes it difficult for the card to be registered in the correct position in the recording and reproducing device.

Another solution is to record the identification number or account number image data on the recording layer 5, instead of that data being visible, so as to prevent forgery or alteration. However, this scheme results in the space available on layer 5 being substantially reduced. This is because the amount of space required, especially for image data, is prodigious. Furthermore, if a reproducing device is not available there is no way to verify that image data stored on layer 5.

SUMMARY OF THE INVENTION

In view of the above-described problems associated with the prior art optical cards an objective of this invention is an optical card having a readily verifiable area where the visible character and image data are recorded. Another objective of this invention is an optical card resistant to forgery or alteration. A further objective is a device to reproduce the data on this card.

The present invention achieves the above objectives with an optical card, on which data are recorded and reproduced optically, which consists of a base layer on which visible data are entered, and a transparent optical recording layer, having nonvisible digital data, which is formed on top of that visible data base layer.

The reading device for an optical card of this invention has a visual data, or character, scanner to read the visible data printed on the base layer of the card. A standard light beam device reads the nonvisible data, consisting of pits formed in the transparent recording layer formed over the visual data base layer.

DETAILED DESCRIPTION OF THE INVENTION

Figure 1:
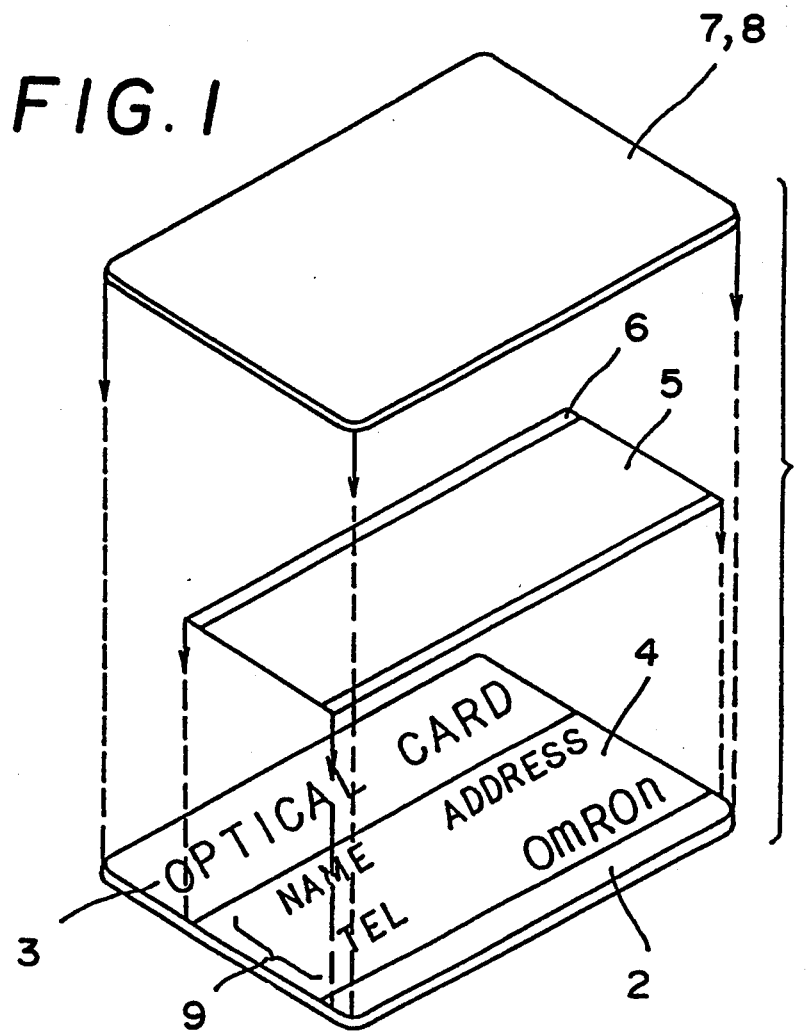
FIG. 1 is an oblique view illustrating the actual structure of the optical card of this invention.
Figure 2:
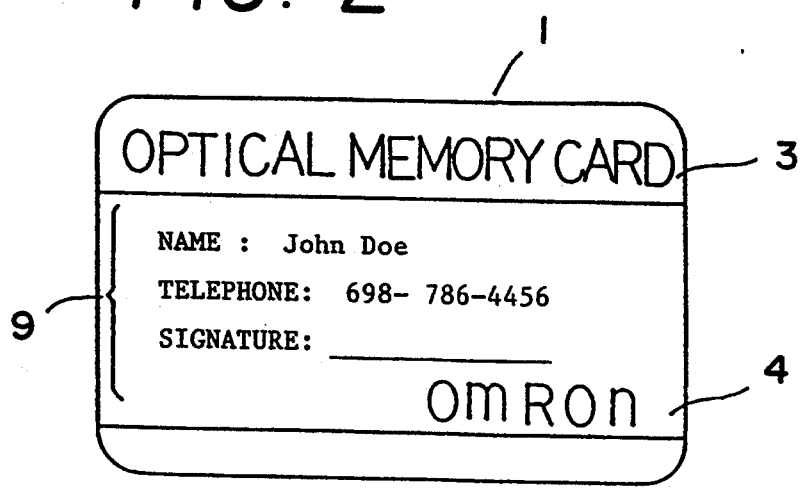
FIG. 2 is a cross section to show how the optical card in our example is actually constructed.
Figure 3:
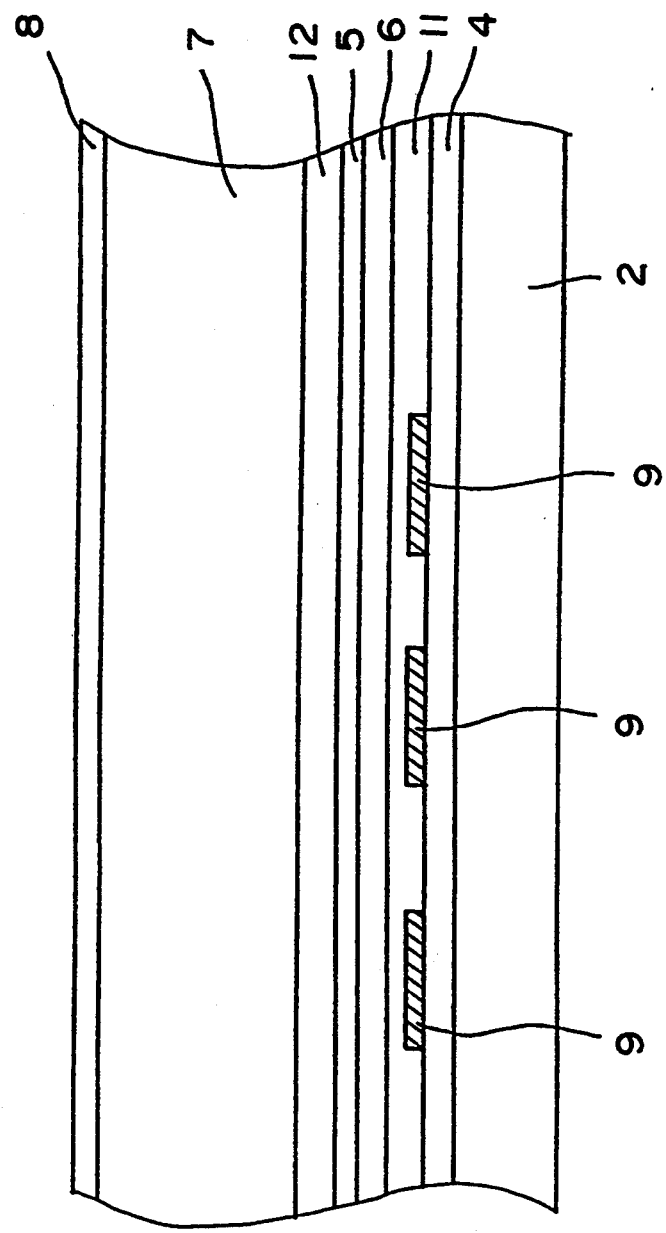
FIG. 3 is a flat view showing the basic appearance of an example of the optical card of this invention.
Figure 9:
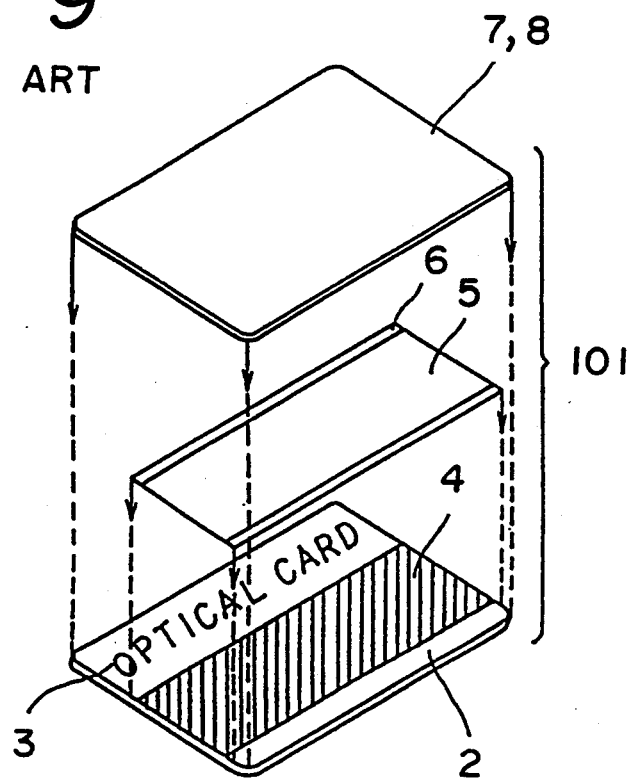
FIG. 9 is an oblique view showing the actual structure of a prior art optical card.
Figure 10:
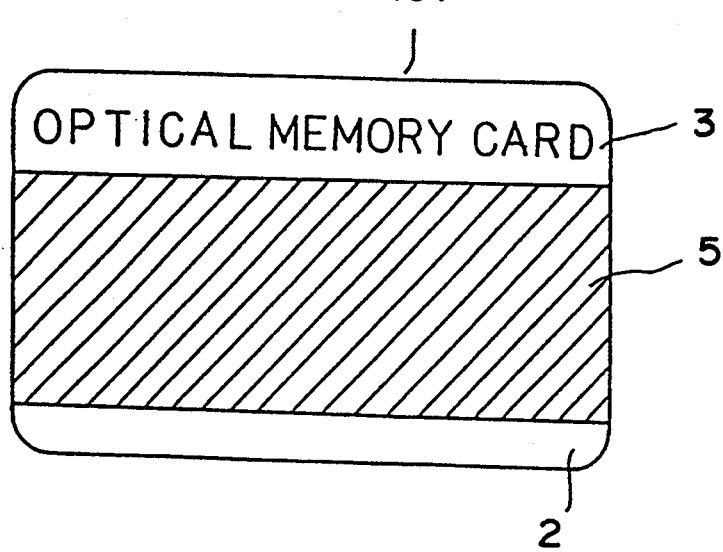
FIG. 10 is a flat view showing the basic structure of a prior art optical card.

This section explains an embodiment of the present invention, with reference to FIGS. 1 through 3. Elements identical to those shown in the prior art FIG. 9 are given the same numbers.

FIG. 1 is an oblique view illustrating the actual structure of the optical card 1 of this embodiment. On this card 1, the visible data 9, which include such information as name, address and telephone number, are printed (and thus entered) on light-absorbing print layer 4. Recording layer 5, on which data will be recorded by, for example, the established method of forming pits for diffracting a light beam, is laminated via film 6 onto the light-absorbing print layer 4, on which visible data 9 have been printed. Transparent layer 7 and protective layer 8 are then laminated, in that order, in such a way as to cover the entire surface of base layer 2. The optical card 1 of this embodiment is formed.

FIG. 2 is a cross section showing the structure of optical card 1. In this figure, visible data 9 are printed on light-absorbing print layer 4. Film 6 is attached to layer 4 by means of adhesive 11. Recording layer 5 is laminated on top of film 6. Transparent layer 7 and protective layer 8 are attached by means of adhesive 12.

FIG. 3 is a flat view showing the basic appearance of the optical card 1. It shows examples of the visible data 9 printed on the card: name, phone number and signature. Data 9 could also include a photograph or other image data.

With an optical card 1 structured in this described manner, film 6 covers the light-absorbing print layer 4, where visible data 9 are printed. If someone attempts to peel off film 6 to forge or alter information, the recording layer 5 will be destroyed.

Figure 4:
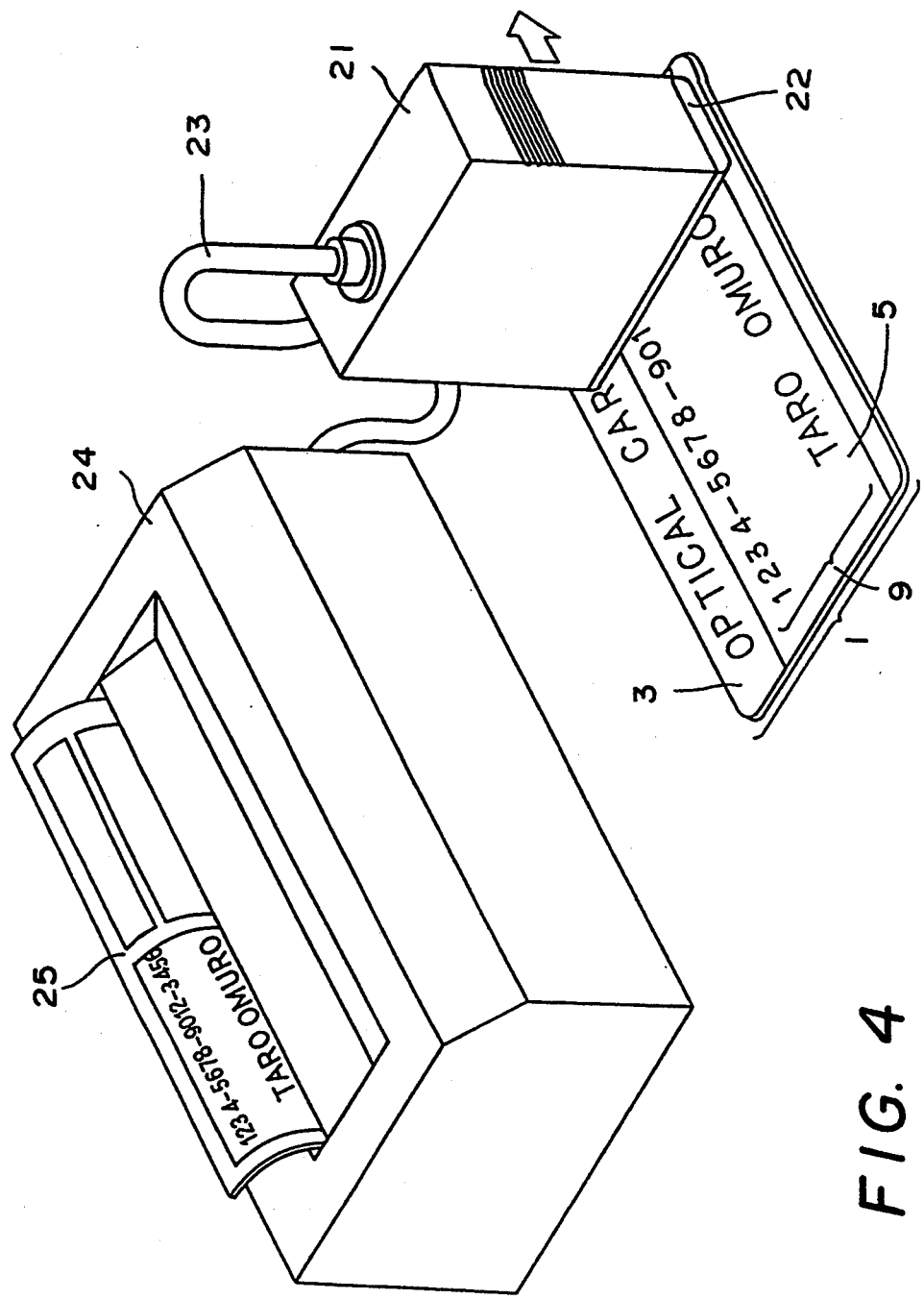
FIG. 4 is an oblique view showing the overall appearance of one example of the optical card reader of this invention.

An example of the data reading device which reads the visible data printed on optical card 1, with reference to FIGS. 4 and 5 will now be described. A description of an optical data reading device which reads the nonvisible data formed as pits in layer 5 is not presented, as it is identical to the light beam reader of prior art. In FIG. 4, the data reader 21 has an image scanner 22 which optically reads the images in the visible data 9. When the data reader 21 moves in the direction indicated by the arrow, image scanner 22 begins to scan. The image data read by the image scanner 22 in the course of its scan are transmitted to printer 24 through transmission cable 23. The image data transmitted to the printer 24 are printed on document 25.

Figure 5:
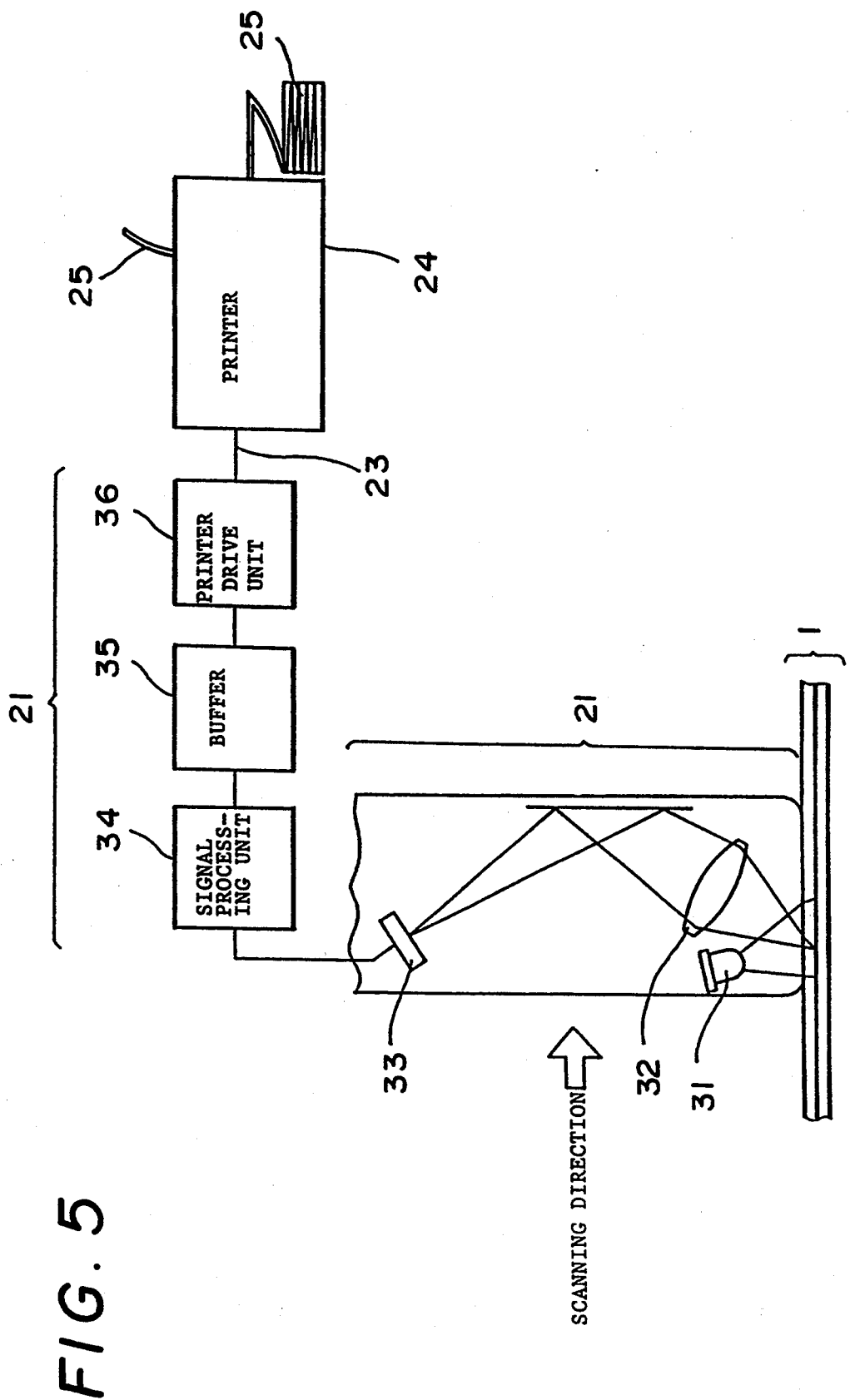
FIG. 5 is a block diagram illustrating the actual structure of an optical card reader in which this invention has been implemented.

FIG. 5 is a block diagram illustrating the actual structure of the data reader 21. As shown in that figure, optical beam emitter 31 outputs an optical beam. When data reader 21 moves in the direction shown by the arrow, the reader begins to scan in the specified direction. The optical beam is directed to the region where visible data 9 are printed on the optical card 1. The optical beam reflected by the optical card 1 passes through lens 32 and is directed to the optical beam detector 33. This detector 33 converts the light received into electrical signals corresponding to the quantity of light. These electrical signals are input into signal processing unit 34, where they are processed so as to increase the contrast and remove the noise and are then binarized. These binarized signals are input into buffer 35, where they are temporarily stored. When buffer 35 accumulates one page worth of data, those data are input into printer 24 by way of printer drive unit 36 and data transmission cable 23.

Figure 6:
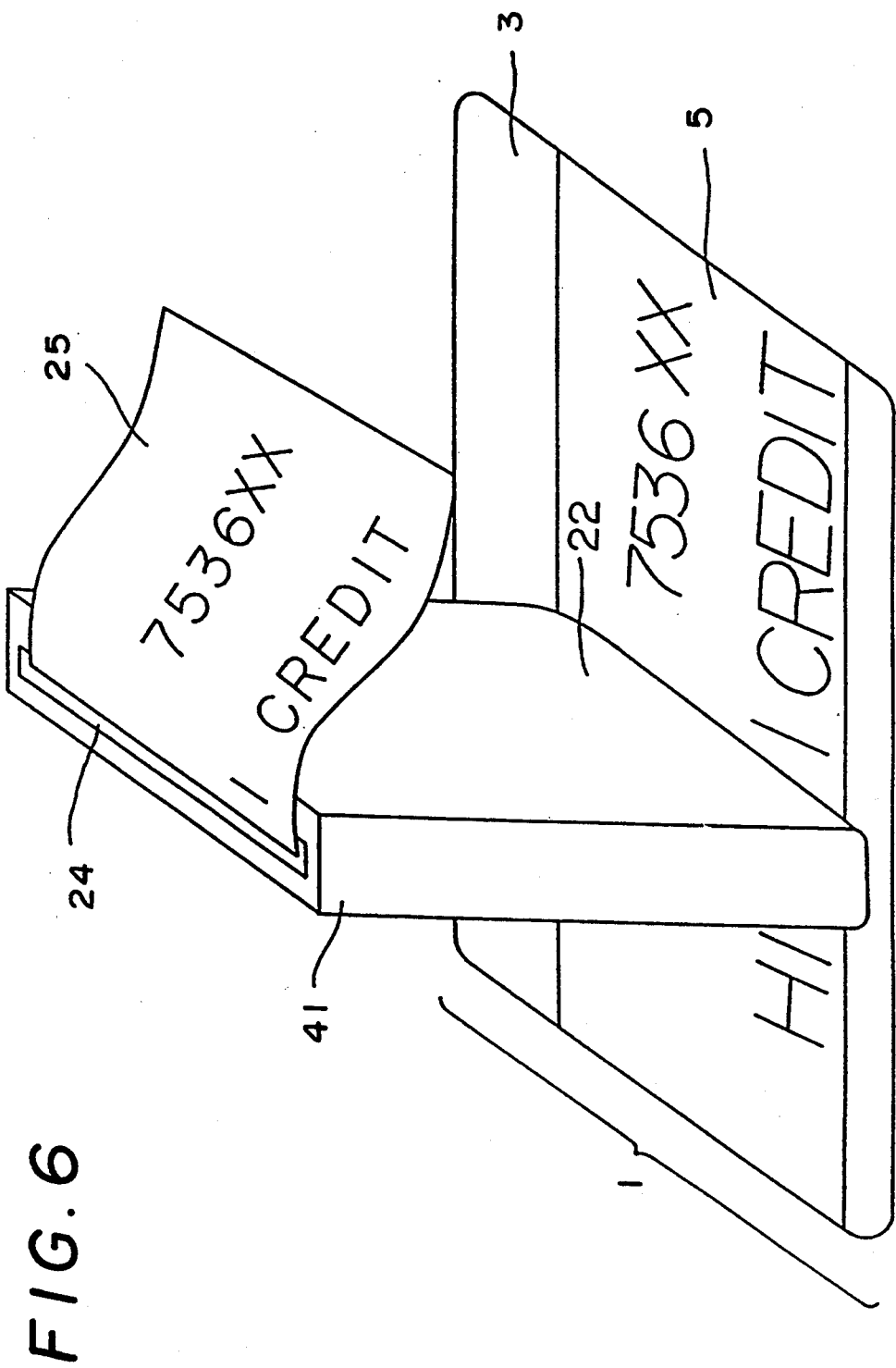
FIG. 6 is an oblique view of the overall appearance of another example of how the card reader of this invention might be implemented.

It is possible to combine image scanner 22 and printer 24 in a single device, as shown in data reader 41 in FIG. 6. In this way, the images within the printed visible data 9 can be printed on document 25. With this scheme, optical card 1 can be used to produce documents in the same way as embossed magnetic cards, such as credit cards, are used.

Visible data 9 may be printed in an ink whose reflectivity is virtually identical to that of light-absorbing print layer 4 with respect to light in the visible wavelength region, but which differs from print layer 4 in its reflective characteristics within wavelengths beyond the visible spectrum, such as infrared. Printing visible data 9 with such an ink will result in the printed data being essentially not visible to the eye; but the printed image data can be detected by a data reader which scans the image with an infrared beam. This feature allows the optical card to have the function served by the watermark on paper money, and makes the card further resistant to forgery.

Figures 7A, 7B, 7C, 7D:
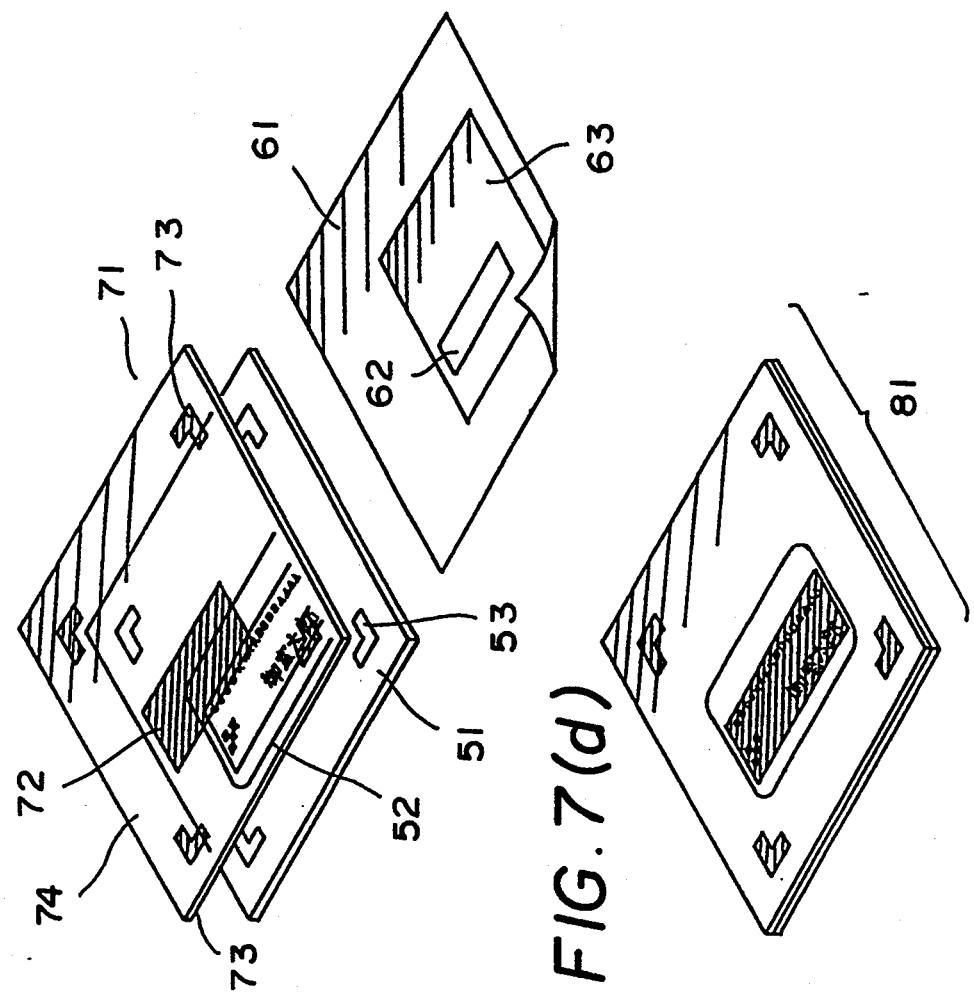
FIGS. 7a–d shows the order of the processes involved in the manufacture and issuance of a sample optical card following the design of this invention.

The steps for producing a specific example card 82 of the optical card 1 will now be described, with reference to FIGS. 7 and 8. For this example, the produced card will be a credit card. As is shown in FIG. 7(a), card pattern 52, consisting of the shape of the card, the logo, and other information, and positioning marks 53 have already been printed on base layer 51, which is covered with a protective sheet 61. Sheet 61 has a hole 62 cut in it corresponding to the position where the signature, which will be one of the items in the visible data 9, will be placed. Protective sheet 61 has another protective sheet, 63, affixed so that it covers hole 62.

As can be seen in FIG. 7(b), the cardholder removes protective sheet 63 and signs his name with pen 54 on the light-absorbing print layer 4. This signature is then covered and preserved by the protective sheet 63. The cardholder then sends the base layer 51, which is also covered by the protective sheet 61, to the card manufacturing facility. At the manufacturing facility, the protective sheet 61 is removed from the base layer 51. The multilayer sheet 71, which will form the recording layer, is then applied to the base layer 51 in such a way that positioning marks 53 coincide with the positioning marks 73 (FIG. 7(c)). Multilayer sheet 71 consists of a recording layer 72, a transparent layer 73 and a protective layer 74, which correspond, respectively, to layers 5, 7, and 8 of the generic card shown in FIGS. 1-3. In this way optical card assembly 81 is formed, as shown in FIG. 7(d).

Figure 8A:
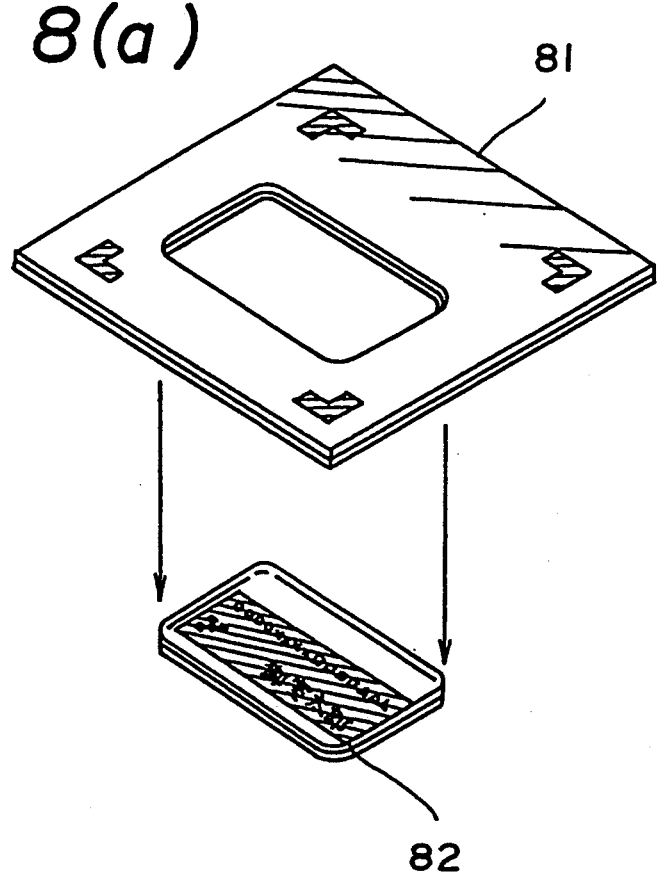
FIGS. 8a–b are a continuation of the process shown in FIG. 7.
Figure 8B:
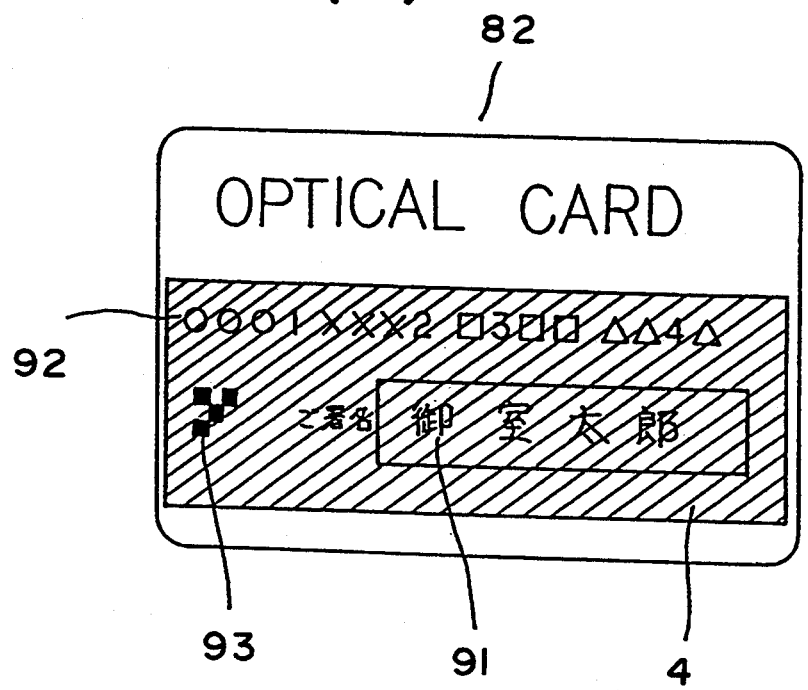

Next, the optical card 82 is punched out along the indicated pattern, as shown in FIG. 8(a), and the card is completed. FIG. 8(b) is a flat view showing the appearance of the completed optical card 82. Except for signature 91, all the visible data, i.e., trademark 93 and identification number 92, were printed as light-absorbing print layer 4 on base layer 51.

As was discussed above, the optical card described in this application is a card on which data can be recorded and reproduced optically. Visible data are entered on the base layer of this card, and an optically transparent recording layer, for recording nonvisible data, is formed above these visible data. This allows the region where the data, consisting of characters, images, or the like, are stored to be visually checked, and serves to prevent forgery or alteration of the data.

The foregoing description this invention is given in terms of the specific embodiments described herein. However, upon reading this disclosure adaptation, variations and modifications within the spirit and scope of this invention will become readily apparent to one of ordinary skill in the art. Such adaptations and modifications are within the intended scope of this invention and are fully comprehended within the scope and meaning of the appended claims. It is understood that the phraseology and terminology employed herein is for the purpose of description only and has no limitative intention whatsoever.

What is claimed is:

1. An optical card to record and reproduce optical data, comprising:
   a base layer having means for holding printed data; and
   a substantially transparent recording layer having means for storing optical data, formed on said base layer, said means for storing optical data comprising a plurality of pits formed in said recording layer for diffraction of a light beam.

2. An optical card to record and reproduce optical data according to claim 1, wherein said means for holding printed data comprises a light-absorbing layer coated on said base layer, on which said printed data is marked.

3. An optical card to record and reproduce optical data claimed 2, wherein said printed data is marked by an ink having a reflectivity virtually identical to a reflectivity of said light-absorbing layer in a visible wavelength light, and wherein said ink has reflective characteristics differing from the reflectivity of said light-absorbing layer in an invisible wavelength light, so that said printed data can be detected by a light within said invisible wavelength.

4. An optical card to record and reproduce optical data claimed 1, wherein said printed data is visible.

5. An optical card system comprising:
an optical card including:
a base layer having means for holding printed data;
a substantially transparent recording layer having means for storing optical data, formed on said base layer, said means for storing optical data comprising a plurality of pits formed in said recording layer for diffraction of a light beam; and
an optical card reader, having
means for scanning said printed data and generating a binary data corresponding thereto.

* * * * *